United States Patent
Montero et al.

(10) Patent No.: US 11,550,382 B2
(45) Date of Patent: *Jan. 10, 2023

(54) POWER-SUBSYSTEM-MONITORING-BASED GRAPHICS PROCESSING SYSTEM

(71) Applicant: Dell Products L.P., Round Rock, TX (US)

(72) Inventors: Adolfo S. Montero, Pflugerville, TX (US); Philip Joseph Grossmann, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/929,364

(22) Filed: Jul. 15, 2020

(65) Prior Publication Data
US 2020/0348748 A1 Nov. 5, 2020

Related U.S. Application Data

(63) Continuation of application No. 15/904,104, filed on Feb. 23, 2018, now Pat. No. 10,761,592.

(51) Int. Cl.
*G06F 1/3287* (2019.01)
*G06F 1/3212* (2019.01)

(52) U.S. Cl.
CPC .......... *G06F 1/3287* (2013.01); *G06F 1/3212* (2013.01)

(58) Field of Classification Search
CPC .............................. G06F 1/3287; G06F 1/3212
See application file for complete search history.

(56) References Cited

U.S. PATENT DOCUMENTS

| | | | | |
|---|---|---|---|---|
| 7,421,601 | B2* | 9/2008 | Bose | G06F 1/3203 713/320 |
| 7,814,485 | B2 | 10/2010 | Morgan et al. | |
| 8,662,943 | B2 | 3/2014 | Conroy et al. | |
| 9,035,956 | B1* | 5/2015 | Schreyer | G06F 1/3228 345/506 |
| 9,390,461 | B1* | 7/2016 | Jane | G06F 9/442 |
| 11,054,884 | B2* | 7/2021 | Skerry | G06F 1/3209 |
| 2006/0103996 | A1 | 5/2006 | Carroll et al. | |

(Continued)

*Primary Examiner* — Aurel Prifti
(74) *Attorney, Agent, or Firm* — Joseph Mencher

(57) ABSTRACT

A power-subsystem-monitoring-based computing system includes a power subsystem coupled to a first computing component. A throttling engine throttles the first computing component when the power subsystem exceeds its maximum power consumption, and de-throttles the first computing component when the power subsystem no longer exceeds its maximum power consumption. The throttling engine also throttles the first computing component when the power subsystem exceeds its rated power consumption for a first time period, and de-throttles the first computing component when the power subsystem no longer exceeds its rated power consumption. The throttling engine also reduces the operating capabilities of the first computing component when throttling has been performed for more than a second time period, and increases the operating capabilities of the first computing component when the throttling has been performed for less than the second time period and the first computing component is operating below its desired operating capability.

20 Claims, 8 Drawing Sheets

(56) References Cited

U.S. PATENT DOCUMENTS

| | | | |
|---|---|---|---|
| 2006/0190745 A1* | 8/2006 | Matsushima | G06F 1/3203 713/300 |
| 2007/0049134 A1* | 3/2007 | Conroy | G06F 1/3296 439/894 |
| 2007/0050646 A1* | 3/2007 | Conroy | G06F 1/3287 713/300 |
| 2007/0067136 A1* | 3/2007 | Conroy | G06F 1/206 702/130 |
| 2007/0250722 A1 | 10/2007 | Montero et al. | |
| 2009/0089470 A1* | 4/2009 | Ven | G06F 13/24 710/260 |
| 2012/0272086 A1 | 10/2012 | Anderson et al. | |
| 2013/0060555 A1 | 3/2013 | Thomson et al. | |
| 2013/0159741 A1* | 6/2013 | Schluessler | G06F 1/329 713/320 |
| 2013/0332753 A1 | 12/2013 | Varma et al. | |
| 2014/0089699 A1* | 3/2014 | O'Connor | G09G 5/363 713/300 |
| 2015/0006937 A1 | 1/2015 | Rotem et al. | |
| 2015/0058617 A1* | 2/2015 | Oishi | G06F 11/3457 713/100 |
| 2015/0253830 A1 | 9/2015 | Montero et al. | |
| 2015/0309551 A1 | 10/2015 | Yeager et al. | |
| 2016/0066266 A1* | 3/2016 | Law | H04W 52/028 455/574 |
| 2016/0077565 A1* | 3/2016 | Jayaseelan | G06F 9/544 713/340 |
| 2017/0116840 A1 | 4/2017 | Montero et al. | |
| 2017/0180261 A1* | 6/2017 | Ma | H04L 5/0055 |
| 2017/0220062 A1* | 8/2017 | Shen | G06F 1/14 |
| 2017/0220087 A1 | 8/2017 | Hijazi et al. | |
| 2017/0255251 A1 | 9/2017 | Zhang et al. | |
| 2017/0308155 A1* | 10/2017 | Lu | G06F 1/325 |
| 2018/0039324 A1* | 2/2018 | Lee | G06F 1/3228 |
| 2018/0120926 A1* | 5/2018 | Brown | G06F 1/3203 |
| 2019/0034316 A1* | 1/2019 | Levit-Gurevich | G06F 11/3612 |

\* cited by examiner

POWER-SUBSYSTEM-MONITORING-BASED GRAPHICS PROCESSING SYSTEM

CROSS-REFERENCE TO RELATED APPLICATION

The present disclosure is a continuation of U.S. patent application Ser. No. 15/904,104, filed on Feb. 23, 2018, the disclosure of which is incorporated herein by reference.

BACKGROUND

The present disclosure relates generally to information handling systems, and more particularly to processing graphics via an information handling system based on the monitoring of a power subsystem that provides power to the information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, desktop computing devices, laptop/notebook computing devices, and/or other computing devices known in the art, include power subsystems that provide the power that allows those computing devices to operate. For example, computing devices often utilize power adapters that couple the computing device to a power source (e.g., a wall outlet), and power adapters are "rated" based on their ability to provide particular characteristics of power (e.g., wattage, current, etc.) to computing devices. As such, computing devices must be utilized with properly rated power adapters that are configured to provide the power characteristics that the computing device needs in order to operate properly. The provisioning of power adapters with computing devices can raise a number of issues.

There are often particular computing device configurations and/or workloads that, when run on the computing device, can exceed the rating of particular power adapters. For example, higher performance graphics processing systems can cause relatively large spikes in power consumption by computing devices. Often, relatively lower rated power adapters will provide for the proper operation of a majority of the computing device configurations and/or a majority of the workloads expected to run on a computing device, while a few computing device configurations and/or workloads (e.g., graphics-intensive workloads) will exceed the rating of those relatively lower rated power adapters. Conventionally, the relatively higher rated power adapters are provided with computing devices if their computing device configurations and/or any of their possible workloads are known to exceed the rating of the relatively lower rated power adapters (e.g., a computing device that includes the high performance graphics processing system discussed above would be provided with the relatively higher rated power adapter.) The need to provide these relatively higher rated power adapters with computing devices based on their worst-case power loading conditions is undesirable, as the relatively higher rated power adapters are physically much larger than the relatively lower rated power adapters, and are associated with significant cost increases as well.

Accordingly, it would be desirable to provide for the ability to use relatively lower rated power adapters with computing devices that have computing device configurations and/or that may perform occasional workloads that can cause the computing device to exceed the rating of those relatively low rated power adapters.

SUMMARY

According to one embodiment, an Information Handling System (IHS) includes a processing system; and a memory system that is coupled to the processing system and that includes instructions that, when executed by the processing system, cause the processing system to provide a throttling engine that is configured to: activate a first throttling of a Graphics Processing Unit (GPU) that is coupled to the processing system when a power subsystem that powers the GPU exceeds a power subsystem maximum power consumption, and deactivate the first throttling of the GPU when the power subsystem no longer exceeds the power subsystem maximum power consumption; activate a second throttling of the GPU when the power subsystem exceeds a power subsystem rated power consumption for a first time period, and deactivate the second throttling of the GPU when the power subsystem no longer exceeds the power subsystem rated power consumption; and reduce the operating capabilities of the GPU when the second throttling has been performed for more than a second time period, and increase the operating capabilities of the GPU when the second throttling has been performed for less than the second time period and the GPU is operating below a GPU predetermined operating capability.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
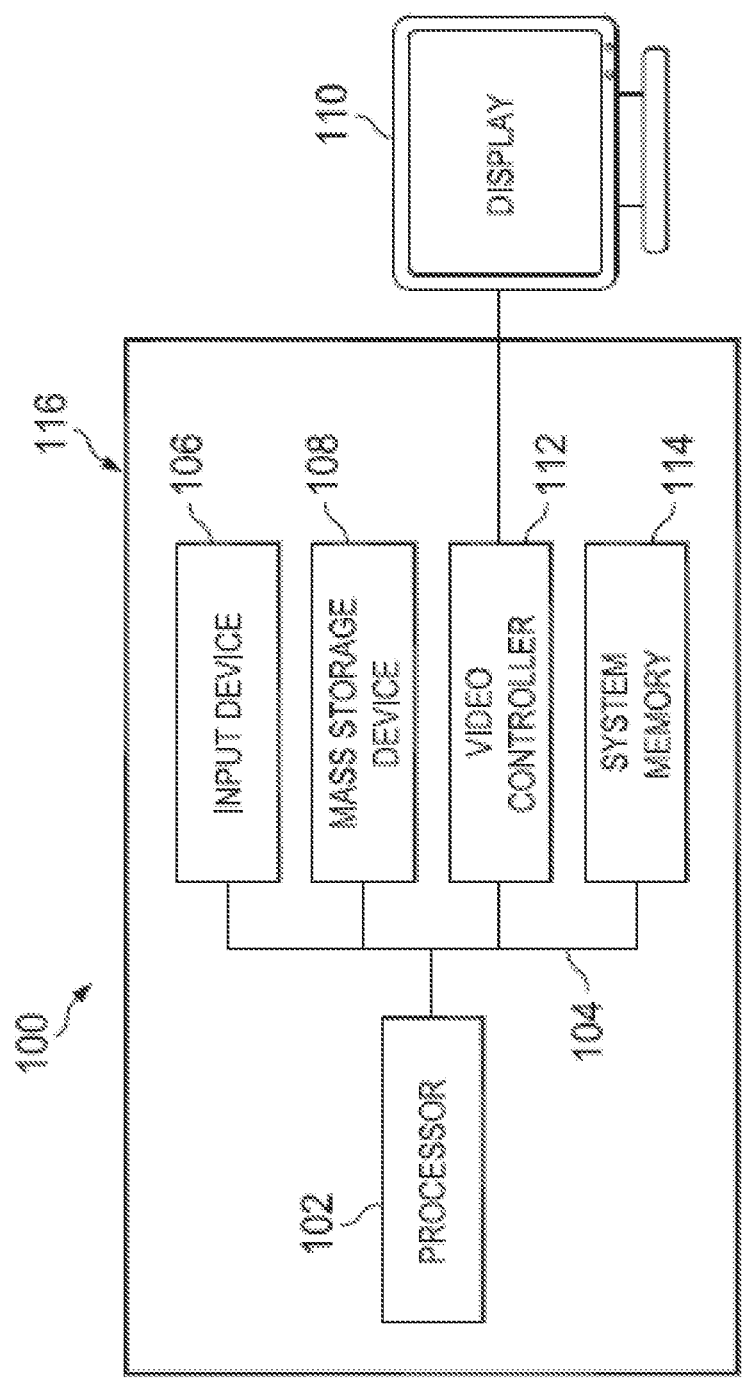
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
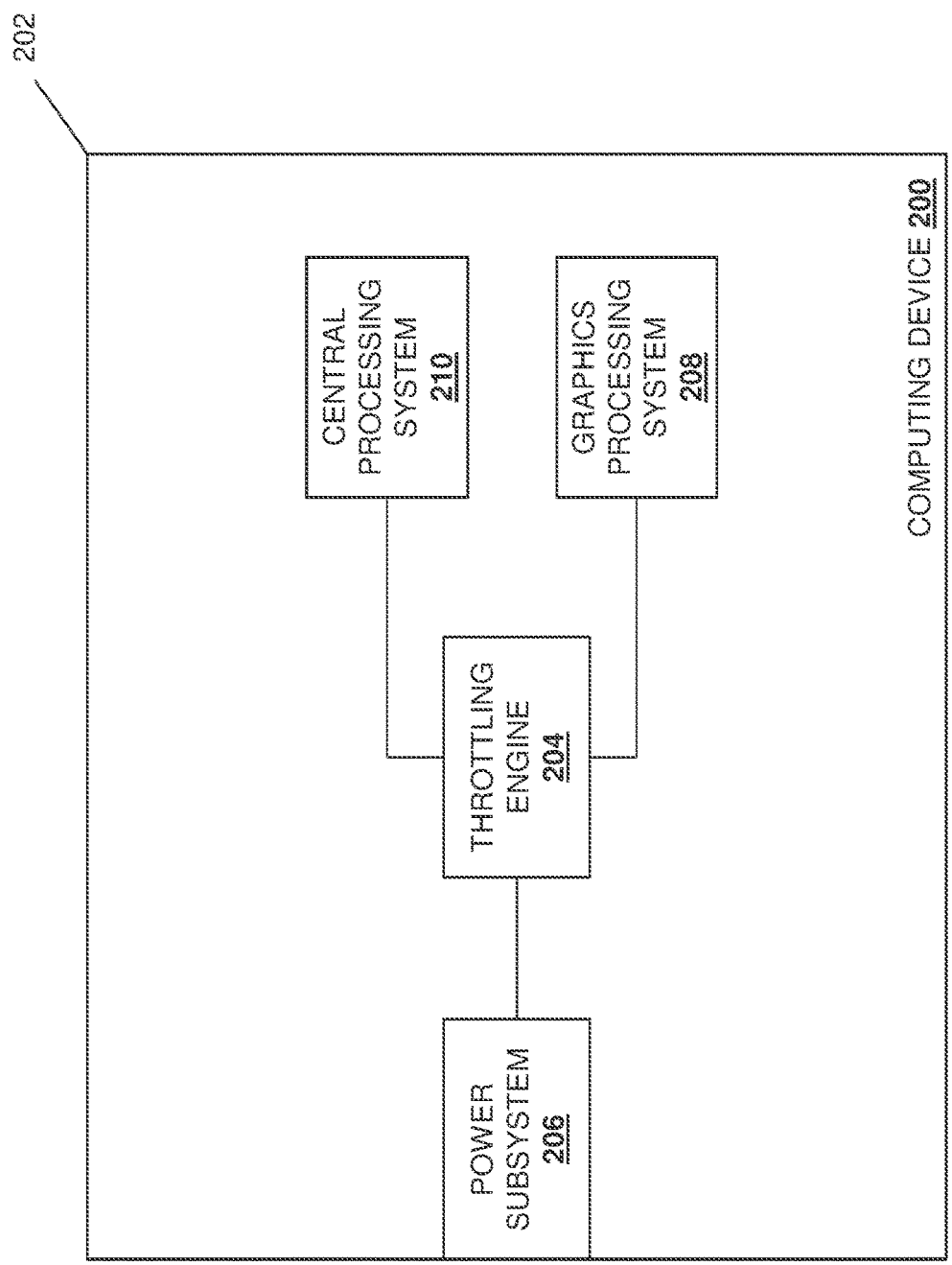
FIG. 2 is a schematic view illustrating an embodiment of a computing device.

Referring now to FIG. 2, an embodiment of a computing device 200 is illustrated that may be the IHS 100 discussed above with reference to FIG. 1, and/or may include some or all of the components of the IHS 100. In the illustrated embodiment, the computing device 200 includes a chassis 202 that houses the components of the computing device 200, only some of which are illustrated in FIG. 2. For example, the chassis 202 may house a processing system (not illustrated, but which may include the processor 102 discussed above with reference to FIG. 1) and memory system (not illustrated, but which may include the memory 114 discussed above with reference to FIG. 1) that is coupled to the processing system and that includes instructions that, when executed by the processing system, cause the processing system to provide a throttling engine 204 that is configured to perform the functions of the throttling engines and computing devices discussed herein. As illustrated and described in the different examples below, the throttling engine 204 may be provided by a variety of combinations of firmware, hardware, and/or software while remaining within the scope of the present disclosure.

The chassis 202 may also house a power subsystem 206 that is coupled to the throttling engine 204 (e.g., via a coupling between the power subsystem 206 and the processing system discussed above) and that may include power supply unit(s), battery subsystem(s), power connector(s), and/or any other power subsystem components or configurations that would be apparent to one of skill in the art in possession of the present disclosure. In many of the examples discussed below, the power subsystem includes a power adapter (e.g., that is coupled to a power connector on the computing device 200 and to a power source via a wall outlet) that is rated for particular power characteristics, but one of skill in the art in possession of the present disclosure will recognize that a battery subsystem rated for particular power characteristics, and/or other power subsystem components rated for particular power characteristics but capable of variable peak power capacity will benefit from the teachings of the present disclosure and thus are envisioned as falling within its scope.

The chassis 202 may house a first computing component and a second computing component that are each coupled to the throttling engine 204 (e.g., via a coupling(s) between those components and the processing system). In the illustrated embodiment, the first computing component is provided by a graphics processing system 208 (e.g., a dedicated Graphics Processing Unit (GPU)) while the second computing component is provided by a central processing system 210 (e.g., a Central Processing Unit (CPU)). As discussed below, the graphics processing system 208/central processing system 210 configuration in the illustrated embodiment provides an example of power-subsystem-monitoring-based graphics processing that enables high performance graphics processing systems (e.g., a gaming GPU) to be utilized with traditionally undersized power subsystems (e.g., relatively low rated power adapters). However, relatively high power consumption components may be substituted for the graphics processing system 208 and/or the central processing system 210 (e.g., a large monitor or other display device) while remaining within the scope of the present disclosure as well. While a specific computing device has been illustrated and described, one of skill in the art in possession of the present disclosure will recognize that computing devices may include a variety of components and/or component configurations in order to provide conventional computing device functionality, as well as the functionality discussed below, while remaining within the scope of the present disclosure.

Figure 3:
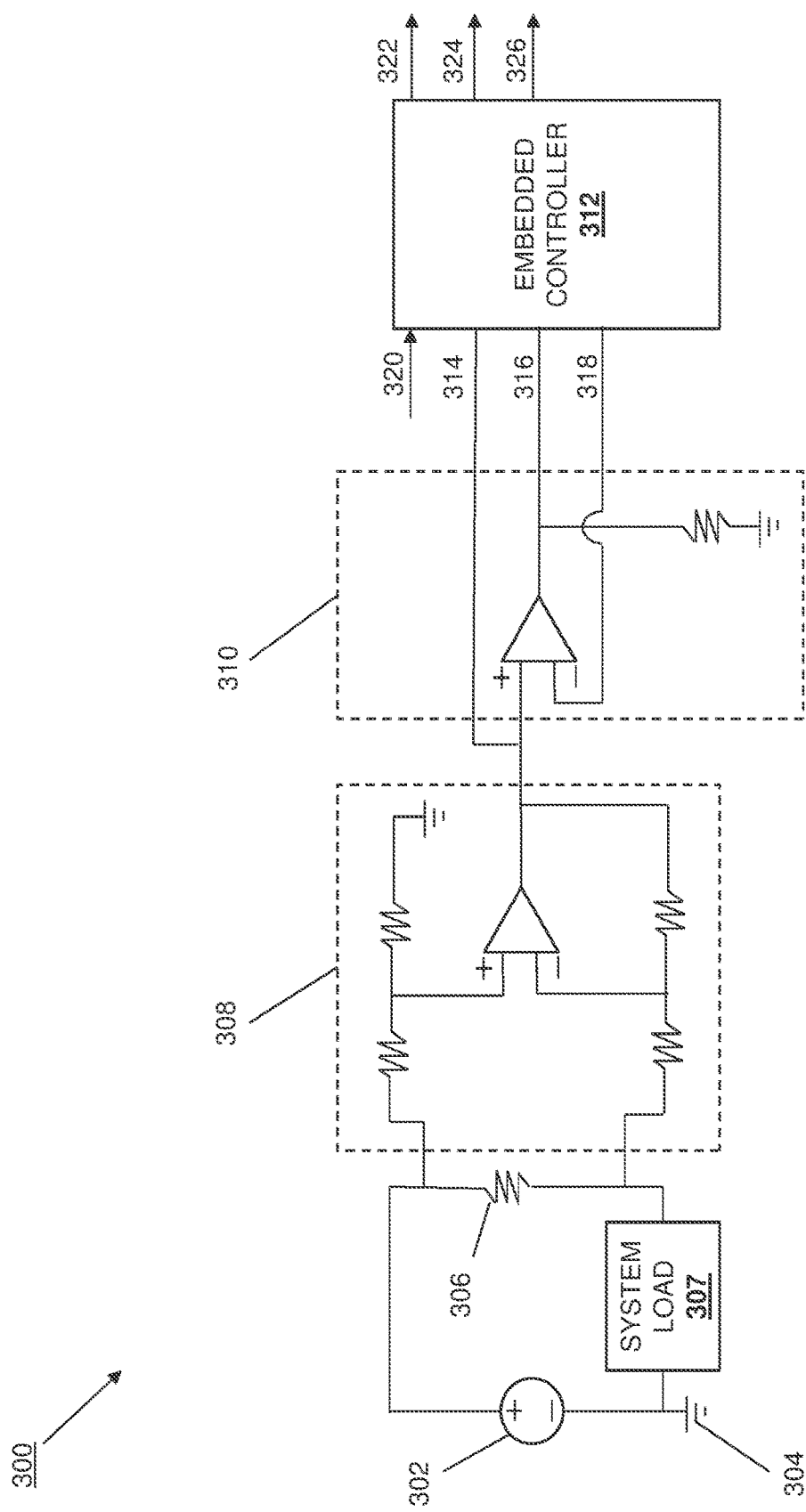
FIG. 3 is a schematic view illustrating an embodiment of a throttling engine that may be included in the computing device of FIG. 2.

Referring now to FIG. 3, a specific embodiment of a throttling engine 300 is illustrated that may be provided as the throttling engine 204 discussed above with reference to FIG. 2. One of skill in the art in possession of the present disclosure will recognize that the embodiment of the throttling engine 300 illustrated in FIG. 3 provides a high-level view of a throttling engine provided, in part, by an embedded controller, and may be adapted to operate as discussed below utilizing a variety of embedded controllers known in the art. In the illustrated embodiment, the throttling engine 300 includes a power subsystem 302 that is configured to provide 19.5 volts of direct power, and that is coupled between a ground connection 304 and a shunt resistor 306, along with a system load 307 that is coupled between the ground connection 304 and the shunt resistor 306 and that may represent power draw or consumption by components in the computing device 200. A difference amplifier 308 is coupled in parallel to the shunt resister 306 and is provided by the configuration of the ground connection, resisters, and amplifier illustrated in FIG. 3. A binary overcurrent sense/comparator 310 is coupled to the difference amplifier 308 and is provided by the configuration of the ground connection, resister, and amplifier illustrated in FIG. 3.

In the illustrated embodiment, an embedded controller 312 includes a coupling 314 to the output of the amplifier in the difference amplifier 308 that provides an analog-to-digital sense for absolute current readings, a coupling 316 to the output of the amplifier in the binary overcurrent sense/comparator 310 that provides a binary overcurrent output, and a coupling 318 to the negative input of the amplifier in the binary overcurrent sense/comparator 310 that provides an adjustable reference digital-to-analog input that allows for the accommodation of a variety of power adapter limits. An input 320 to the embedded controller 312 may provide for the reading of a Power Supply Identifier (PSID) from a power adapter. Furthermore, an output 322 from the embedded controller 312 may provide for the sending of an interrupt signal for CPU hardware throttling, an output 324 from the embedded controller 312 may provide for the sending of an interrupt signal for GPU hardware throttling, and an output 326 from the embedded controller 312 may provide for $I_2C$ communications with a host (e.g., in conjunction with an Application Programming Interface (API) provided for software-based Thermal Design Power (TDP) changes.) One of skill in the art in possession of the present disclosure will recognize that the configuration of the throttling engine 300 provides for the reading of real-time current out from the power subsystem 302 by the embedded controller 312. While a specific throttling engine 300 has been described, one of skill in the art in possession of the present disclosure will recognize that throttling engines may be provided with different components and/or component configurations for providing the functionality discussed below while remaining within the scope of the present disclosure.

Figure 4:
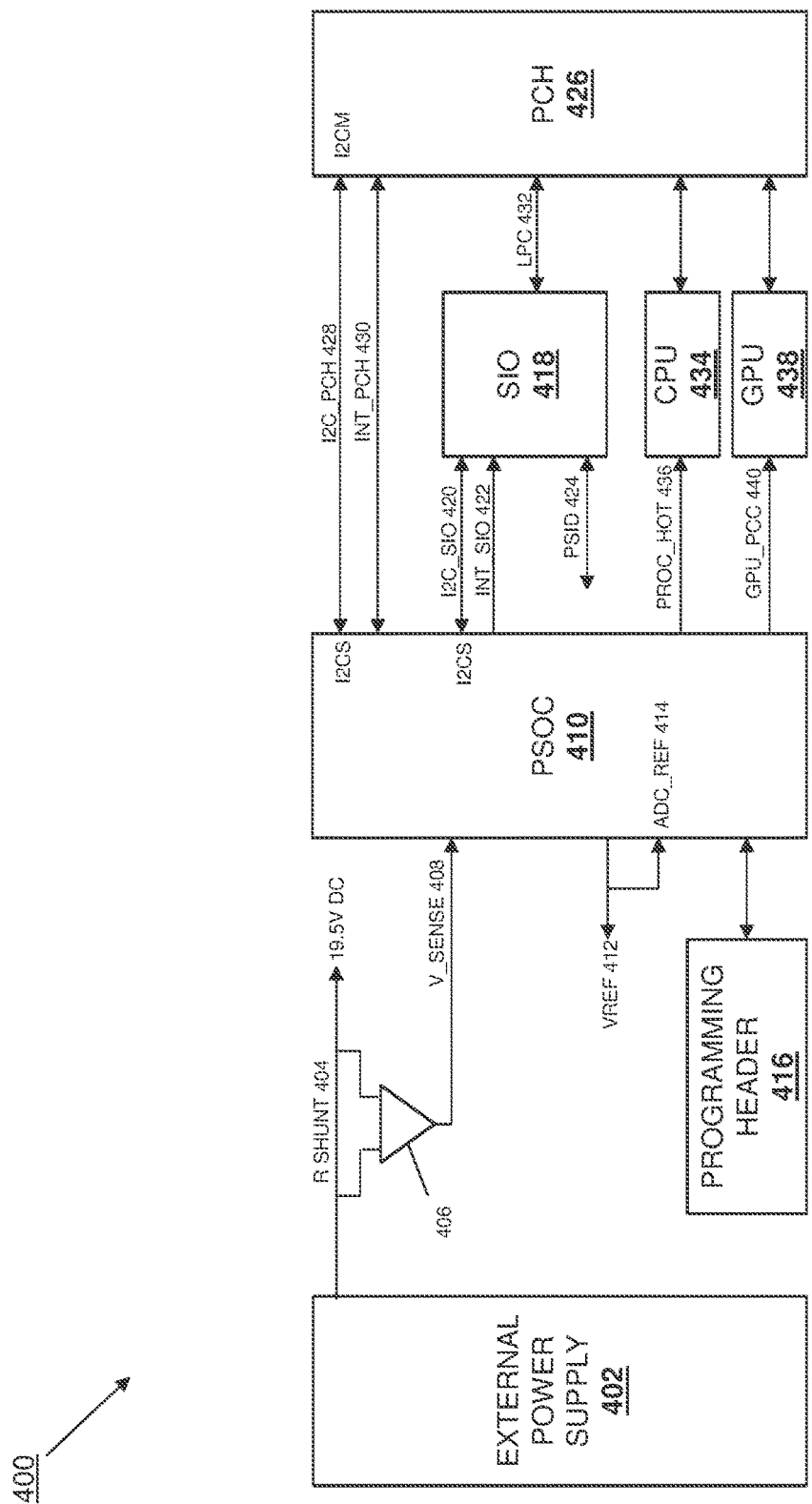
FIG. 4 is a schematic view illustrating an experimental embodiment of components in the computing device of FIG. 2.

Referring now to FIG. 4, an experimental embodiment 400 of components of the computing device 200 of FIG. 2 is illustrated. The experimental embodiment 400 includes an external power supply 402 that may be part of the power subsystem 206 of FIG. 2 and, as discussed herein, includes a power adapter. The external power supply 402 is configured to provide 19.5 volts of direct power through a shunt resister 404 that is coupled in parallel to the inputs on an amplifier 406, with the shunt resister 404/amplifier 406 configured to perform the functionality of the difference amplifier 308 discussed above with reference to FIG. 3. The output on the amplifier 406 provides a voltage sense signal 408 to a Programmable System on a Chip (PSoC) 410 that, in the experimental embodiment, was provided by a CY8C4124LQI-S432 PSoC® available from CYPRESS® Semiconductor of San Jose, Calif., United States, and that included a 24 MhZ ARM M0 microcontroller, 16 Kb flash memory, 4 Kb SRAM, 2×$I_2C$ outputs, 1×ADC12 output, and 5×5 mm QFN32 outputs. The PSoC 410 in the experimental embodiment output a VREF signal 412, received an ADC_REF signal 414, and was capable of a 1Msample/second ADC. Furthermore, a programmable 416 provides an input to the PSoC 410 that may be used, for example, to program/reprogram the PSoC 410/firmware, modify algorithms used by the PSoC 410 (e.g., when doing lab characterizations), and/or other uses that would be apparent to one of skill in the art in possession of the present disclosure.

The experimental embodiment 400 also includes a Super Input/Output (SIO) chip 418 that is coupled to the PSoC 410 via an I2C_SIO coupling 420 and an INT_SIO coupling 422, while also including a PSID input 424 for receiving a PSID from a power adapter that is part of the external power supply 402. Communications between the PSoC 410 and SIO chip 418 utilize a PSoC-to-EC API that enables sharing of information such as, for example, system configuration details, desired TDP states, etc. In an embodiment, the PSoC 410 and the SIO chip 418 are configured to perform the functions of the binary overcurrent sense/comparator 310 and embedded controller 312 of FIG. 3. The experimental embodiment 400 also includes a Platform Controller Hub (PCH) 426 that is coupled to the PSoC 410 via an I2C_PCH coupling 428 and an INT_PCH coupling 430, while also being coupled to the SIO chip 418 by an LPC coupling 432. The experimental embodiment 400 also includes a CPU 434 that is coupled to the PCH 426, and a GPU 438 that is coupled to the PCH 426. The PSoC 410 is coupled to the CPU 434 by a PROC_HOT coupling 436, and is coupled to the GPU 438 by a GPU_PCC coupling 440.

As discussed in further detail below, the experimental embodiment 400 was utilized in a computing device including a 330 W power adapter, a 150 W GPU, and a 65 W CPU, and one of skill in the art in possession of the present disclosure will recognize how the components and/or component configurations illustrated in FIG. 4 may change based on the desired implementation while remaining within the scope of the present disclosure. For example, a relatively large display device (e.g., a 27" Liquid Crystal Display (LCD)) may require a power adapter and/or power subsystem that may be utilized similarly to the power subsystem 206 described herein.

Figure 5:
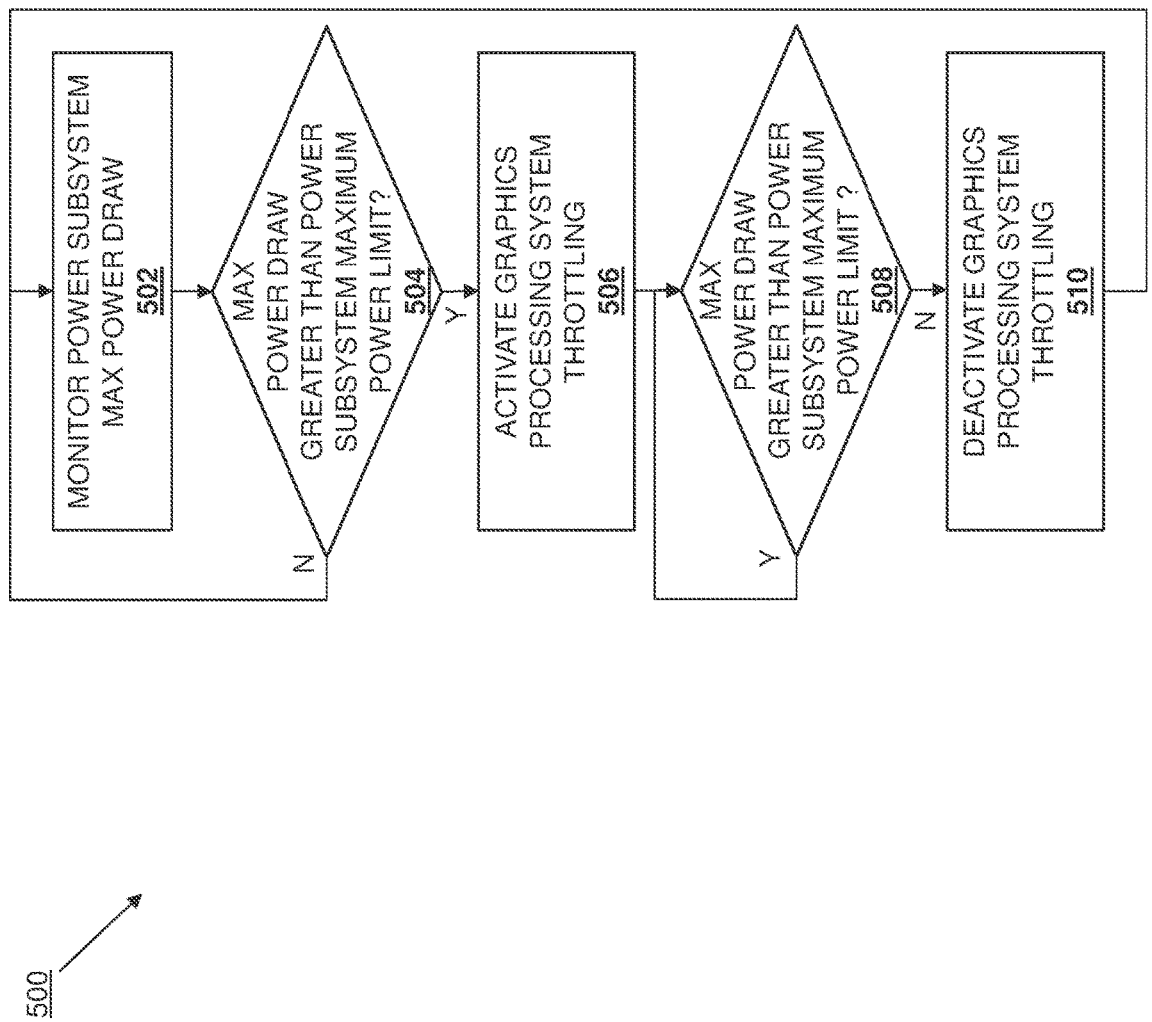
FIG. 5 is a flow chart illustrating an embodiment of a first method for providing power subsystem monitoring-based graphics processing.
Figure 6:
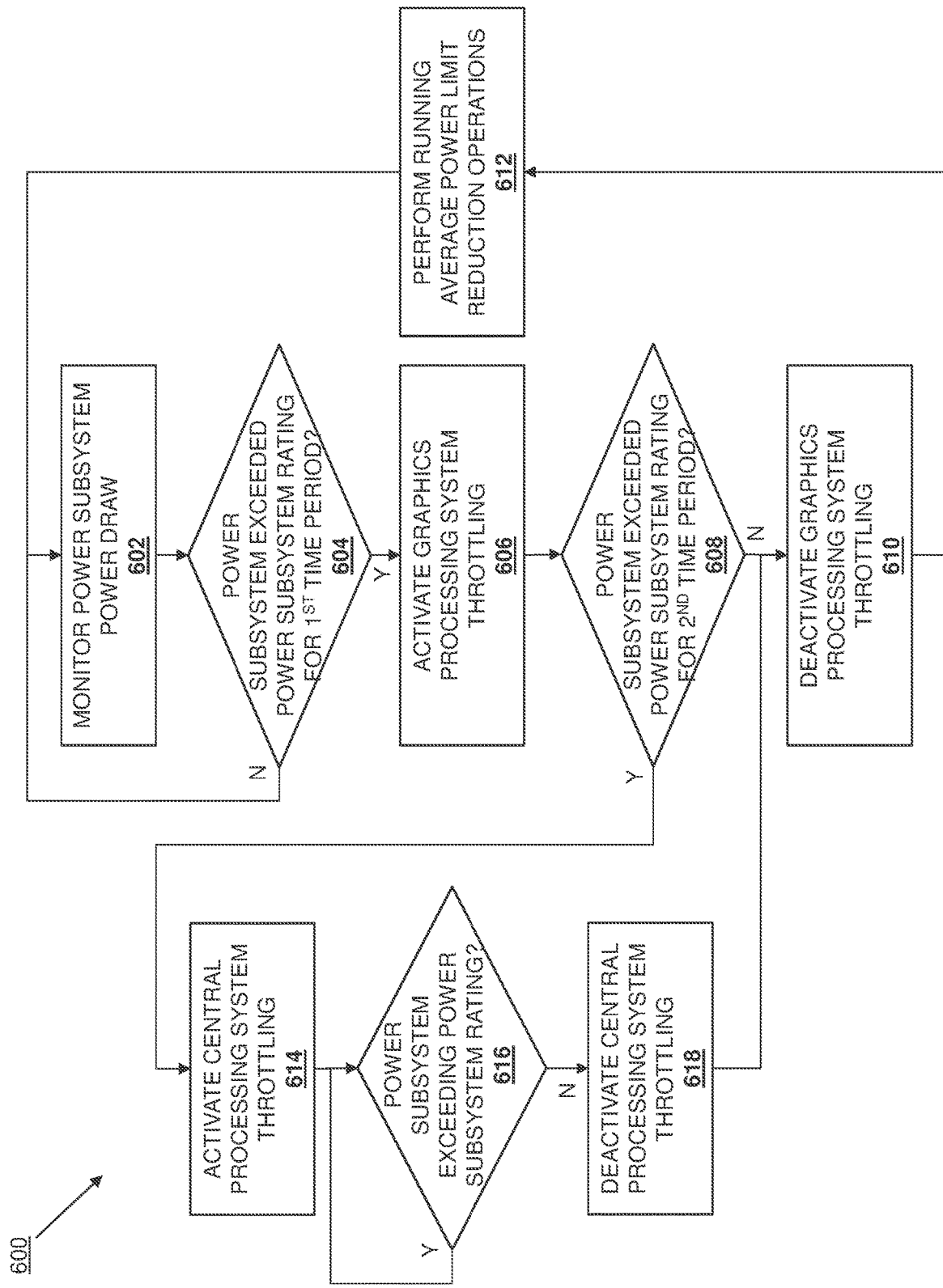
FIG. 6 is a flow chart illustrating an embodiment of a second method for providing power subsystem monitoring-based graphics processing.
Figure 7:
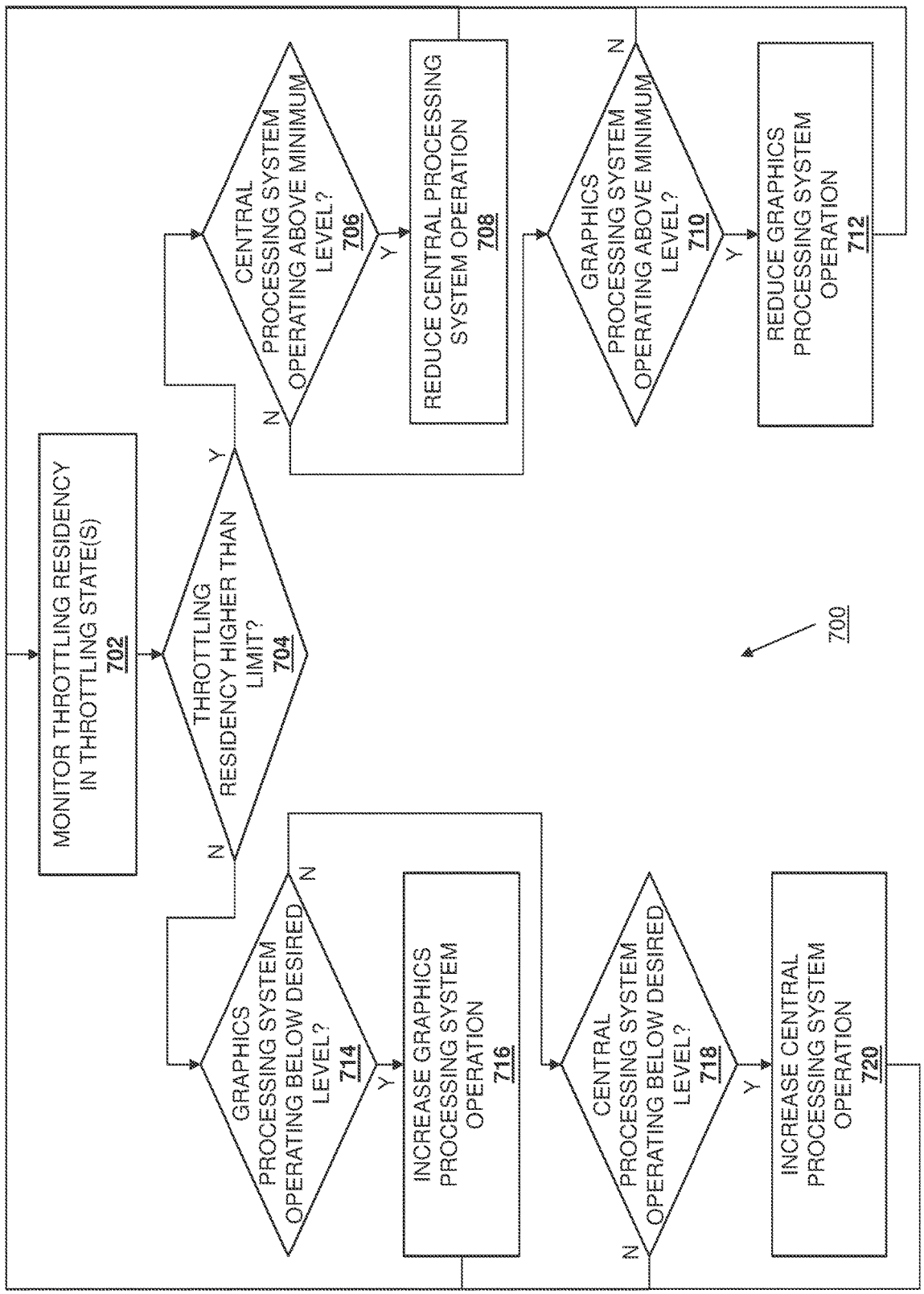
FIG. 7 is a flow chart illustrating an embodiment of a third method for providing power subsystem monitoring-based graphics processing.

Referring now to FIGS. 5, 6, and 7, a plurality of respective control methods 500, 600, and 700 are illustrated that may be performed by the throttling engine and/or computing device of the present disclosure. As discussed below, the systems and methods of the present disclosure provide for real-time, constant, and accurate monitoring of system level power consumption, and acts on that system level power consumption via hardware-based throttling to quickly react to power excursions (e.g., power consumption over a maximum available power level, power consumption over a rated power level for a predetermined time period, etc.) that would otherwise cause shutdown of the power subsystem, while also utilizing software to adjust component operation so that the hardware-based throttling does not impact the user experience more than necessary. The systems and methods of the present disclosure allow previously unsupported computing device configurations to be provided, while allowing relatively lower rated power subsystems to be utilized with computing devices that include computing device configurations and/or that are expected to execute workloads that may occasionally exceed the power capabilities of those power subsystems.

Referring first to FIG. 5, the method 500 begins at block 502 where a maximum power draw by the power subsystem is monitored. In an embodiment, at or prior to block 502, the throttling engine 204 may operate to characterize the power subsystem 206 and determine power characteristics such as, for example, the power subsystem maximum power limit discussed below. For example, with reference to the throttling engine 300 of FIG. 3, at or prior to block 502, the embedded controller 312 may utilize the input 320 to determine a PSID of a power adapter that is included in the power subsystem 206 (e.g., coupled to each of a power connector on the computing device 200 and a power source via a wall outlet), and then use that PSID to perform a database lookup of the power characteristics of that power adapter such as, for example, a power adapter maximum current limit. With reference to the experimental embodiment 400 illustrated in FIG. 4, at or prior to block 502, the SIO chip 418 may receive a PSID (e.g., from a power adapter that is part of the external power supply 402) via the PSID input 424, and use that PSID to perform a database lookup of the power characteristics of that power adapter. In one particular example of the experimental embodiment 400, a 330 W power adapter was utilized that included a power adapter maximum current limit of 25 A. In addition to characterizing the power subsystem 206, at or prior to block 502, characteristics of the computing device 200, any of its components, and/or its configuration may be determined and utilized when performing throttling according to the method 500.

As would be understood by one of skill in the art in possession of the present disclosure, Alternating Current (AC) power adapters may be rated at a thermal (indefinite) load, and for brief periods of time may be capable of delivering power that exceeded that thermal load. Furthermore, components such as graphics processing systems are also known to exceed their power rating/expected power consumption by 2-3× for relatively short periods of time. Power adapter manufacturers and other providers may provide computing device manufacturers with data that details the power characteristics of their power adapter, and the computing device manufacturer may link each of those power adapters (e.g., via their PSIDs) to their power characteristics in a database. For example, experimental embodiments of 180 W power adapters designed to operate at 19.5V and 9.23 A have been found to allow a maximum current consumption that exceeds 13 A for 10 ms, 16 A for 1 ms, and 16.5 A for 500 μs; experimental embodiments of 240 W power adapters designed to operate at 19.5V and 12.3 A have been found to allow a maximum current consumption that exceeds 17.5 A for 10 ms, 19.5 A for 1 ms, and 20 A for 500 μs; and experimental embodiments of 330 W power adapters designed to operate at 19.5V and 16.9 A have been found to allow a maximum current consumption that exceeds 26.5 A for 10 ms, 28 A for 5 mx, 29 A for 1 ms, and 29.5 A for 500 μs. As discussed below, the systems and methods of the present disclosure allow for the safe and reliable operation in these higher current regions for brief periods of time.

At block 502, the throttling engine 204 operates to monitor the maximum power draw via the power subsystem 206. For example, with reference to the throttling engine 300 of FIG. 3, at block 502, the difference amplifier 308 and the binary overcurrent sense/comparator 310 monitor and report the power drawn via the power subsystem 302 to the embedded controller 312 via the couplings 314, 316, and/or 318, and the embedded controller 312 monitors the maximum power draw via the power subsystem 302. With reference to the experimental embodiment 400 illustrated in FIG. 4, at block 502 the external power supply 402 is configured to provide 19.5V of direct current, while the shunt resistor 404 and the amplifier 406 provide the voltage sense signal 408 to the PSoC 410 that allows the PSoC 410 to monitor the maximum current draw via the external power supply 402. However, while a few specific examples have been provided, one of skill in the art in possession of the present disclosure will recognize that a wide variety of maximum power draw characteristics may be monitored at block 502 while remaining within the scope of the present disclosure.

The monitoring of the maximum power draw via the power subsystem may be enabled by the throttling engine 204, the embedded controller 312, and/or the PSoC 410 utilizing a relatively high sampling rate that is configured to identify power spikes that occur over relatively short time periods. For example, in experimental embodiments, an ADC utilized in the system was configured to sample at one million samples per second, with the data utilized by the method 500 as discussed herein. It has been found that the use of such high sampling rates allows for less conservative throttling algorithms, providing users of the computing device with a better user experience when throttling the operation of components to prevent power adapter shutdown. Furthermore, one of skill in the art in possession of the present disclosure will recognize that the method 400 performs at even higher speeds due to the use of a hardware comparator with direct access to the GPU_PCC pin.

The method 500 then proceeds to decision block 504 where it is determined whether the maximum power draw is greater than the power subsystem maximum power limit. In an embodiment, at decision block 504, the throttling engine 204 determines whether the maximum power draw via the power subsystem 206 exceeds a power subsystem maximum power limit associated with the power subsystem 206 (e.g., retrieved via the PSID database lookup as discussed above.) For example, with reference to the throttling engine 300 of FIG. 3, at decision block 504 the embedded controller 312 may compare a power being drawn via the power subsystem 302 to a power subsystem maximum current limit determined during the power subsystem characterization discussed above. With reference to the experimental embodiment 400 illustrated in FIG. 4, at block 502 the PSoC 410 may compare a current being drawn via the external power supply 402 to a power subsystem maximum current limit determined during the power subsystem characterization discussed above. The determination at decision block 504 may include a hysteresis amount (e.g., a determination may be made as to whether the current being drawn is greater than the power subsystem maximum current limit minus the hysteresis amount (e.g., 0.2 A)) in order to provide for smoother operation of the system. If, at decision block 504, it is determined that the maximum power draw is not greater than the power subsystem maximum power limit, the method 500 returns to block 502 to monitor the maximum power draw via the power subsystem substantially as discussed above.

If, at decision block 504, it is determined that the maximum power draw is greater than the power subsystem maximum power limit, the method 500 then proceeds to block 506 where graphics processing system throttling is activated. In an embodiment, at block 506 and in response to determining that a maximum power has been drawn via the power subsystem 206 that is greater than a power subsystem maximum power limit, the throttling engine 204 may operate to activate throttling of the graphics processing system 208. For example, with reference to the throttling engine 300 of FIG. 3, at block 506 the embedded controller 312 may utilize the output 324 to send an interrupt signal for GPU hardware throttling. With reference to the experimental embodiment 400 illustrated in FIG. 4, at block 506 the PSoC 410 may utilize the GPU_PCC coupling 440 to send a signal that causes throttling of the GPU 438. In the experimental embodiment 400, it was found that the GPU_PCC coupling 440 (which was a GPU PCC pin provided on a GPU available from Advanced Micro Devices (AMD®) of Sunnyvale, Calif., United States) allowed for the assertion of the throttling signal almost instantaneously (experimental embodiments required a time of approximately 38 nanoseconds to see results of assertion of the throttling signal via the GPU PCC pin), and caused an associated modification of the GPU that resulted in the current draw via the power adapter to begin reducing within 10 µs of assertion.

In one specific example, execution of a particular workload via the GPU was found to produce a spike in the current drawn via the power adapter that was approximately 900 µs long, and with a consistent 60 µs surge midway through the spike that peaked in the 31-36 A range, which at a power of 12 volts produced a power draw equivalent of 432 W for 60 µs. In conventional systems, such a peak power consumption would require a power adapter capable of 440 W. However, utilizing the teachings of the present disclosure, with the throttling signal asserted on the GPU PCC pin to the GPU based on a 20 A maximum power adapter current limit for the power adapter, the current draw spike of 36 A was reduced to 20.5 A. Furthermore, this reduction of current draw spike via the power adapter was associated in only a 1.1% decrease in benchmark GPU performance scores by the GPU.

The method 500 then proceeds to decision block 508 where it is determined whether the maximum power draw is greater than the power subsystem maximum power limit in substantially the same manner as described above with reference to decision block 504. If, at decision block 508, it is determined that the maximum power draw is greater than the power subsystem maximum power limit, the method 500 loops back through decision block 508 to determine whether the maximum power draw is greater than the power subsystem maximum power limit. As such, the method 500 provides for graphics processing system throttling (as per block 506) until the maximum power draw via the power subsystem is below its power subsystem maximum power limit.

If, at decision block 508, it is determined that the maximum power draw is not greater than the power subsystem maximum power limit, the method 500 then proceeds to block 510 where graphics processing system throttling is deactivated. In an embodiment, at block 510 and in response to determining that the power being drawn via the power subsystem 206 is no longer greater than a power subsystem maximum power limit (i.e., due to the GPU throttling at block 506), the throttling engine 204 may operate to deactivate throttling of the graphics processing system 208. For example, with reference to the throttling engine 300 of FIG. 3, at block 506 the embedded controller 312 may stop asserting the interrupt signal via the output 324 in order to deactivate the GPU hardware throttling. With reference to the experimental embodiment 400 illustrated in FIG. 4, at block 506 the PSoC 410 may stop asserting the interrupt signal via the GPU_PCC coupling 440 to stop the throttling of the GPU 438. In the experimental embodiment 400, it was found that assertion of the throttling signal on the GPU PCC pin typically caused a reduction of the current consumption of the power adapter to a level that is below the power adapter maximum current limit within 100 µs.

The method 500 then returns to block 502 to monitor the maximum power draw by the power subsystem substantially as discussed above. Thus, the method 500 provides for the use of a hardware feedback loop (e.g., via a hardware comparator) to assert a hardware throttling signal (e.g., by a PSoC or embedded controller via the GPU PCC pin) whenever a "hard ceiling" maximum current limit of a power adapter is exceeded. Such power adapter maximum current limits may be detectable (e.g., using the PSID) and programmable such that they differ based on what power adapter is present in the system. As such, for a 330 W power adapter with a power adapter rated current of 16.9 A-25 A, the method 500 allows the computing device to draw power up to the 25 A maximum current limit without the risk of power adapter shutdown. Due to the possibility of system shutdown if the power subsystem is allowed to exceed its power subsystem maximum current limit, the method 500 may be performed independently of the methods 600 and 700 discussed below in order to ensure that the computing device does not shut down due to the power subsystem maximum current limit being exceeded.

In the experimental embodiment discussed above, asserting hardware throttling of the GPU via the GPU PCC pin provided for the reduction of 24 A, 12V power spikes down to 12 A in 80 µs 100% of the time, and deassertion of the hardware throttling of the GPU via the GPU PCC pin allowed the GPU to return to peak performance in 80 µs as well, with ramp up/ramp down beginning in 5-10 µs. With shorter duration assertions of the GPU PCC pin (e.g., less than 1 ms), the GPU performance change was almost negligible based on GPU performance benchmarks, while worst case 10% duty cycle assertions of the GPU PCC pin over longer durations (e.g., greater than 1 ms) were found to reduce frame rates by approximately 5%.

Referring now to FIG. 6, the method 600 begins at block 602 where a power draw of the power subsystem is monitored. In an embodiment, at or prior to block 602, the throttling engine 204 may operate to characterize the power subsystem 206 and determine power characteristics such as, for example, the power subsystem rated power range discussed below. For example, with reference to the throttling engine 300 of FIG. 3, at or prior to block 602 the embedded controller 312 may utilize the input 320 to determine a PSID of a power adapter that is included in the power subsystem 206 (e.g., coupled to each of a power connector on the computing device 200 and a power source via a wall outlet), and then use that PSID to perform a database lookup of the power characteristics of that power adapter such as, for example, a power adapter rated current range. With reference to the experimental embodiment 400 illustrated in FIG. 4, at or prior to block 602 the SIO chip 418 may receive a PSID from a power adapter that is part of the external power supply 402 via the PSID input 424, and use that PSID to perform a database lookup of the power characteristics of that power adapter. In one particular example of the experimental embodiment 400, a 330 W power adapter was utilized that included a power adapter rated current range of 16.9 A-25 A. In addition to characterizing the power subsystem 206, at or prior to block 602, characteristics of the computing device 200, any of its components, and/or its configuration may be determined and utilized when performing throttling according to the method 600.

At block 602, the throttling engine 204 operates to monitor the power draw via the power subsystem 206. For example, with reference to the throttling engine 300 of FIG. 3, at block 602, the difference amplifier 308 and the binary overcurrent sense/comparator 310 monitor and report the power drawn via the power subsystem 302 to the embedded controller 312 via the couplings 314, 316, and/or 318, and the embedded controller 312 monitors the power draw via the power subsystem 302. With reference to the experimental embodiment 400 illustrated in FIG. 4, at block 602 the external power supply 402 provides 19.5V of direct current, which results in the shunt resistor 404 and the amplifier 406 providing the voltage sense signal 408 to the PSoC 410 that allows the PSoC 410 to monitor the current consumption via the external power supply 402. However, while a few specific examples have been provided, one of skill in the art in possession of the present disclosure will recognize that a wide variety of power consumption characteristics may be monitored at block 602 while remaining within the scope of the present disclosure The method 600 then proceeds to decision block 604 where it is determined whether the power subsystem has exceeded its power subsystem rating for a first time period. In an embodiment, at decision block 604, the throttling engine 204 determines whether the power subsystem 206 has exceeded its power subsystem rating (e.g., retrieved via the PSID database lookup as discussed above) for a first time period. For example, with reference to the throttling engine 300 of FIG. 3, at decision block 604 the embedded controller 312 may determine whenever a power being drawn via the power subsystem 302 has exceeded a power subsystem rating by entering into a power subsystem rated current range determined during the power subsystem characterization discussed above, and then determine whether power has been drawn in that power subsystem rated current range for a first time period. With reference to the experimental embodiment 400 illustrated in FIG. 4, at block 604 the PSoC 410 may determine a current being drawn via the external power supply 402 exceeds its power subsystem rating by entering a power subsystem rated current range (e.g., 16.9 A-25 A in the example above) determined during the power subsystem characterization discussed above, and remained in that power subsystem rated current range for 7 milliseconds (ms). While a specific first time period has been provided, one of skill in the art in possession of the present disclosure will recognize that the first time period may be selected based on a variety of factors that will fall within the scope of the present disclosure. If, at decision block 604, it is determined that the power draw is not greater than the power subsystem rating, the method 600 returns to block 602 to monitor the power draw via the power subsystem substantially as discussed above If, at decision block 604, it is determined that the power subsystem has exceeded its power subsystem rating for the first time period, the method 600 then proceeds to block 606 where graphics processing system throttling is activated. In an embodiment, at block 606 and in response to determining that power has been drawn via the power subsystem 206 such that the power subsystem has exceeded its power subsystem rating for the first time period, the throttling engine 204 may operate to activate throttling of the graphics processing system 208. For example, with reference to the throttling engine 300 of FIG. 3, at block 606 the embedded controller 312 may utilize the output 324 to send an interrupt signal for GPU hardware throttling. With reference to the experimental embodiment 400 illustrated in FIG. 4, at block 606 the PSoC 410 may utilize the GPU_PCC coupling 440 to send a signal that causes throttling of the GPU 438. Similarly as discussed above, in the experimental embodiment 400, it was found that the GPU_PCC coupling 440 (which was a GPU PCC pin provided on a GPU available from Advanced Micro Devices (AMD®) of Sunnyvale, Calif., United States) allowed for the assertion of the throttling signal almost instantaneously (experimental embodiments found time of approximately 38 nanoseconds to assert the throttling signal via the GPU PCC pin), and caused an associated modification of the GPU that resulted in the current draw via the power adapter to begin reducing within 10 microseconds (µs) of assertion.

As such, the throttling engine 204, embedded controller 312, and/or the PSoC 410 may utilize a feedback loop with a timer to determine whether power drawn by the system has caused the power subsystem 206, power subsystem 302, or external power supply 402 to exceed its power subsystem rating for some time period (e.g., 7 ms in the example above) and, in response, throttle the operation of the graphics processing system 208 or GPU 438. Thus, the feedback loop/timer along with precision current monitoring (e.g., via the ADC_REF signal 414) may be configured to allow power consumption spikes that are greater than the power subsystem rating (e.g., the power adapter thermal rating) but less than the power subsystem maximum power (e.g., the power adapter maximum current draw), and that are less than 7 ms in length, before throttling the GPU.

The method 600 then proceeds to decision block 608 where it is determined whether the power subsystem has exceeded its power subsystem rating for a second time period. In an embodiment, at decision block 608, the throttling engine 204 determines whether the power subsystem 206 has exceeded its power subsystem rating (e.g., retrieved via the PSID database lookup as discussed above) for a second time period that immediately follows the first time period. For example, with reference to the throttling engine 300 of FIG. 3, at decision block 606 the embedded controller 312 may determine whenever a power being drawn via the power subsystem 302 has exceeded a power subsystem rating by entering into a power subsystem rated current range determined during the power subsystem characterization discussed above, and then determine whether power has been drawn in that power subsystem rated current range for a second time period that immediately follows the first time period. With reference to the experimental embodiment 400 illustrated in FIG. 4, at block 604 the PSoC 410 may determine a current being drawn via the external power supply 402 has exceeded its power subsystem rating by entering a power subsystem rated current range (e.g., 16.9 A-25 A in the example above) determined during the power subsystem characterization discussed above, and remained in that power subsystem rated current range for 1 ms immediately following the 7 ms that resulted in the GPU throttling at block 604. While a specific second time period has been provided, one of skill in the art in possession of the present disclosure will recognize that the second time period may be selected based on a variety of factors that will fall within the scope of the present disclosure.

If, at decision block 608, it is determined that the power subsystem has not exceeded its power subsystem rating for the second time period, the method 600 then proceeds to block 610 where graphics processing system throttling is deactivated. In an embodiment, at block 610 and in response to determining that the power subsystem has not exceeded its power subsystem rating for the second time period (i.e., due to the GPU throttling at block 606), the throttling engine 204 may operate to deactivate throttling of the graphics processing system 208. For example, with reference to the throttling engine 300 of FIG. 3, at block 610 the embedded controller 312 may stop asserting the interrupt signal via the output 324 in order to deactivate the GPU hardware throttling. With reference to the experimental embodiment 400 illustrated in FIG. 4, at block 610 the PSoC 410 may stop asserting the interrupt signal via the GPU_PCC coupling 440 to stop the throttling of the GPU 438. Similarly as discussed above, in the experimental embodiment 400, it was found that assertion of the throttling signal on the GPU PCC pin typically caused a reduction of the current consumption via the power adapter to a level that is below the power adapter rated current range within 100 μs.

The method 600 then proceeds to block 612 where running average power limit reduction operations are performed. In an embodiment, at block 612, the throttling engine 204 may operate to determine whether the power subsystem 206 is operating at a high average power draw (e.g., e.g., an average power draw that is relatively high within the power subsystem rated power range) and, if so, work to reduce the power draw via the power subsystem 206 until the average power draw of the power subsystem 206 is reduced to a desired level. For example, to reduce average power draw, a current average power draw may be regularly computed over a time period (e.g., 1 second), and then subsequent average power draws going forward may then be "tuned" by reducing a power trip point for the method 500 by a weighted value that is proportional to the amount by which the power trip point was exceeded (e.g., if the current power draw exceeds 330 W for 1 s, the method 500 may begin tripping at 320 W, and so on, and if the average power draw does not drop, the method 500 may continue to reduce the power trip point to 310 W, 300 W, etc., until the average power draw comes in line with a desired average power draw.) One of skill in the art in possession of the present disclosure will recognize that entering into the method 500 more often impacts the method 500 counter performed by the method 600, thereby triggering the method 600, and providing a net effect of a rapid decrease in power consumption. The method 600 then returns to block 602 to monitor the power draw by the power subsystem substantially as discussed above.

If, at decision block 608, it is determined that the power subsystem has exceeded its power subsystem rating for the second time period, the method 600 then proceeds to block 614 where central processing system throttling is activated. In an embodiment, at block 614 and in response to determining that the power subsystem continues to exceed its power subsystem rating for the second time period (i.e., despite to the GPU throttling at block 606), the throttling engine 204 may operate to activate throttling of the central processing system 208. For example, with reference to the throttling engine 300 of FIG. 3, at block 614 the embedded controller 312 may assert an interrupt signal via the output 322 in order to activate the CPU hardware throttling. With reference to the experimental embodiment 400 illustrated in FIG. 4, at block 614 the PSoC 410 may assert the interrupt signal via the PROC_HOT coupling 436 to activate throttling of the CPU 434.

As discussed above, in the experimental embodiment 400, it was found that assertion of the throttling signal on the GPU PCC pin typically caused a reduction of the current consumption via the power adapter to a level that is below the power adapter rated current range within 100 μs. Thus, the CPU throttling performed at block 614 was not required in most cases, and is only expected to be utilized in extreme power consumption scenarios. However, in such extreme scenarios when GPU throttling cannot reduce power consumption below the power adapter rated current range, CPU throttling allows a large reduction in the power consumption. Such CPU throttling requires a 2-3 ms response time, and the effects of CPU throttling will likely be noticeable to the user of the computing device, so the system may be configured such that the performance of block 614 is a relatively rare occurrence.

The method 600 then proceeds to decision block 616 where it is determined whether the power subsystem continues to exceed its power subsystem rating. In an embodiment, at decision block 616, the throttling engine 204 determines whether the power subsystem 206 continues to exceed its power subsystem rating following the activation of the throttling of the central processing system 210. For example, with reference to the throttling engine 300 of FIG. 3, at decision block 616 the embedded controller 312 may determine whenever a power being drawn via the power subsystem 302 continues to exceed the power subsystem rating by remaining in the power subsystem rated current range subsequent to the throttling of the CPU. With reference to the experimental embodiment 400 illustrated in FIG. 4, at block 616 the PSoC 410 may determine a current being drawn via the external power supply 402 continues to exceed its power subsystem rating by remaining in the power subsystem rated current range (e.g., 16.9 A-25 A in the example above) subsequent to the throttling of the CPU 434.

If, at decision block 616, it is determined that the power subsystem continues to exceed its power subsystem rating, the method 600 loops back through decision block 616 to determine whether the power subsystem continues to exceed its power subsystem rating. As such, the method 600 provides for central processing system throttling (as per block 614) until the power subsystem no longer exceeds its power subsystem rating. If, at decision block 616, it is determined that the power subsystem no longer exceeds its power subsystem rating, the method 600 then proceeds to block 618 where central processing system throttling is deactivated. In an embodiment, at block 618 and in response to determining that the power subsystem no longer exceeds its power subsystem rating (i.e., due to the CPU throttling at block 614), the throttling engine 204 may operate to deactivate throttling of the central processing system 208. For example, with reference to the throttling engine 300 of FIG. 3, at block 618 the embedded controller 312 may stop asserting the interrupt signal via the output 322 in order to deactivate the CPU hardware throttling. With reference to the experimental embodiment 400 illustrated in FIG. 4, at block 618 the PSoC 410 may stop asserting the interrupt signal via the PROC_HOT coupling 436 to stop the throttling of the CPU 434.

Thus, the method 600 provides for the drawing of power via the power adapter above its rated power for short periods of time, allowing for the use of that power adapter with a system that produces transient power consumption spikes that would typically require a relatively higher rated power adapter. When the power consumption spikes result in a power draw via the power adapter that is above its rated power for more than a first time period (e.g., 7 ms), the GPU may be throttled to ensure that the power adapter does not shut down, while if power continues to be drawn via the power adapter that is above its rated power subsequent to the GPU throttling, the CPU may be throttled to ensure that the power adapter does not shut down.

Figure 8:
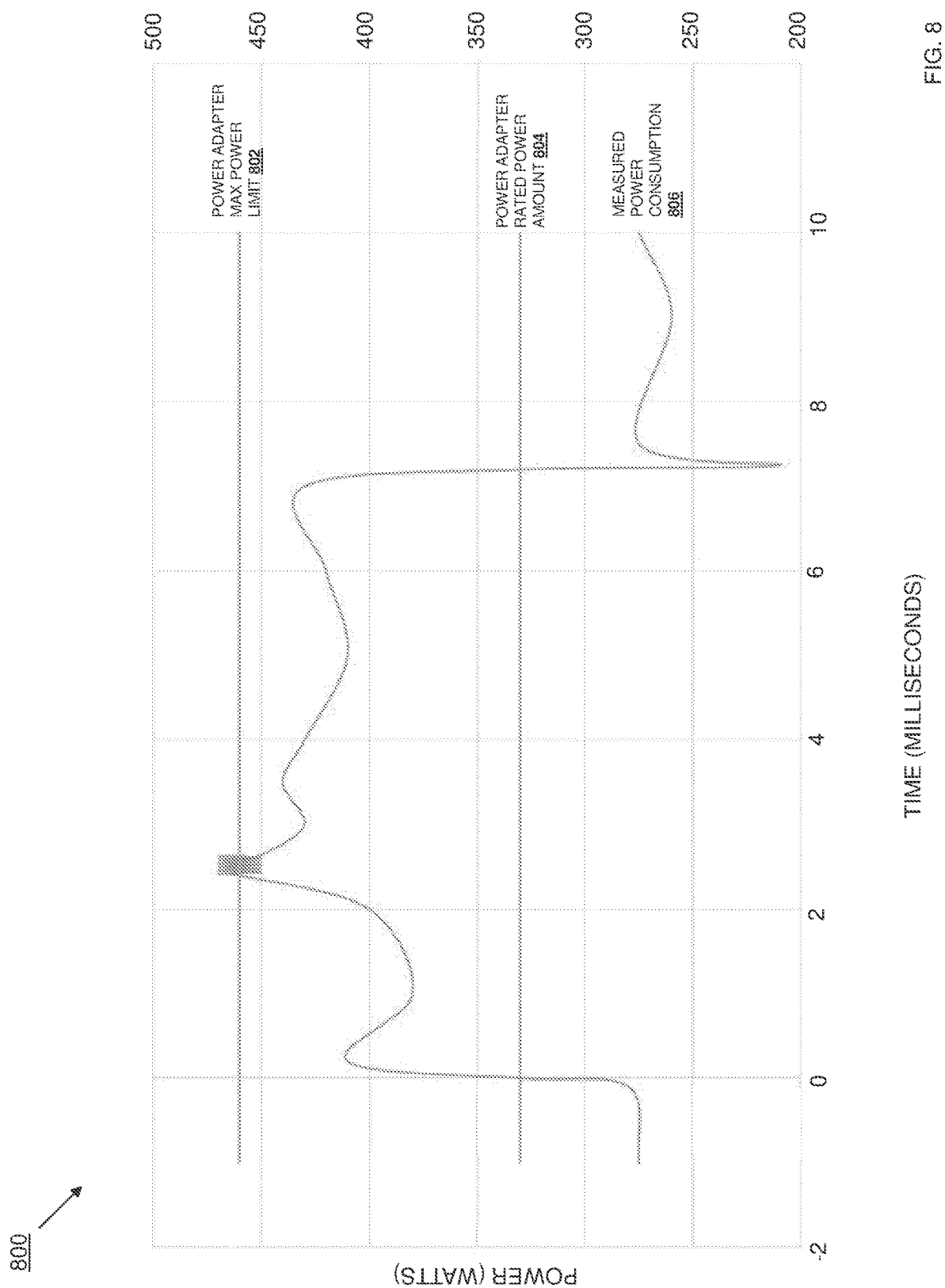
FIG. 8 is a chart illustrating the power usage of the computing device utilizing the systems and methods of the present disclosure.

Referring now to FIG. 8, a chart 800 illustrates the power usage of a computing device during the methods 500 and 600 discussed above. The chart 800 includes power drawn (in watts) on the Y-axis, and time (in milliseconds) on the X-axis, with a power adapter maximum power limit 802 of approximately 460 watts, and a power adapter rated power amount 804 of approximately 380 watts. A measured power consumption 806 illustrates how power consumed may exceed the power adapter rated power amount 804 at time 0ms, and increase up to the power adapter maximum power limit 802 at time 2.5 ms. In response, at time 2.5 ms, the method 500 will cause the GPU throttling to activate, which quickly reduces the power consumed to below the power adapter maximum power limit 802. The measured power consumption 806 then illustrates how the power consumed may continue to remain above the power adapter rated power amount 804 until time 7 ms, at which time the method 600 will cause the GPU and/or CPU throttling to activate in order to reduce the power consumed to below the power adapter rated power amount 804.

Referring now to FIG. 7, the method 700 begins at block 702 where a throttling residency in one or more throttling states is monitored. In an embodiment, at block 702, the throttling engine 204 operates to monitor the how often throttling is activated according to the methods 500 and/or 600 to determine how often the system is subject to throttling (i.e., the "throttling residency" of the system.) For example, with reference to the throttling engine 300 of FIG. 3, at block 702, the embedded controller 312 may monitors how long and/or how often an interrupt signal is asserted via the output 324 to throttle the GPU 324 and/or how long and/or how often an interrupt signal is asserted via the output 322 to throttle the CPU 322. With reference to the experimental embodiment 400 illustrated in FIG. 4, at block 702 the PSoC 410 may monitor how long and/or how often a signal is sent via the GPU_PCC coupling 440 to the GPU 438, and/or how long and/or how often a signal is sent via the PROC_HOT coupling 436 to the CPU 434. However, while a few specific examples have been provided, one of skill in the art in possession of the present disclosure will recognize that throttling residency may be monitored in a variety of ways at block 702 while remaining within the scope of the present disclosure.

The method 700 then proceeds to decision block 704 where it is determined whether the throttling residency is higher than a limit. In an embodiment, at decision block 704, the throttling engine 204 operates to determine whether throttling has been activated more than a predetermined number of times in a predetermined time period according to the methods 500 and/or 600 to determine the throttling residency of the system is higher than a limit. For example, with reference to the throttling engine 300 of FIG. 3, at decision block 704, the embedded controller 312 may determine whether an interrupt signal has been asserted via the output 324 to throttle the GPU 324 more than a predetermined number of times in a predetermined time period, and/or whether an interrupt signal has been asserted via the output 322 to throttle the CPU 322 more than a predetermined number of times in a predetermined time period. With reference to the experimental embodiment 400 illustrated in FIG. 4, at decision block 704 the PSoC 410 may determine whether a signal have been sent via the GPU_PCC coupling 440 to the GPU 438 more than a predetermined number of times in a predetermined time period (e.g., more than 10 times in 1 second.) However, while a few specific examples have been provided, one of skill in the art in possession of the present disclosure will recognize that the determination of whether throttling residency is higher than a limit may be performed in a variety of ways at decision block 704 while remaining within the scope of the present disclosure.

If, at decision block 704, it is determined that the throttling residency is higher than the limit, the method 700 then proceeds to decision block 706 where it is determined whether a central processing system is operating above a minimum level. In an embodiment, at decision block 706, the throttling engine 204 operates to identify the current operating level of the central processing system 210, and determine whether that current operating level is above a minimum operating level for the central processing system 210. For example, with reference to the throttling engine 300 of FIG. 3, at decision block 706, the embedded controller 312 may access registers in the CPU to identify the current operating level of the CPU, and then determine whether that current operating level is above the minimum operating level of the CPU. With reference to the experimental embodiment 400 illustrated in FIG. 4, at decision block 706 the PSoC 410 may access registers in the CPU 434 (e.g., via the SIO chip 418 and/or the PCH 426) to identify the current operating level of the CPU 434, and determine whether that current operating level is above a minimum operating level of the CPU 434. However, while a few specific examples have been provided, one of skill in the art in possession of the present disclosure will recognize that the determination of a current operating level of a CPU, and whether that current operating level is above a minimum operating level, may be performed in a variety of manners while remaining within the scope of the present disclosure.

If, at decision block 706, it is determined that the central processing system is operating above the minimum level, the method 700 then proceeds to block 708 where central processing system operation is reduced. In an embodiment, at block 708, the throttling engine 204 operates to reduce the operating level of the central processing system 210. For example, with reference to the throttling engine 300 of FIG. 3, at decision block 706, the embedded controller 312 may access and modify registers in the CPU to change the current operating level of the CPU (e.g., to instruct the CPU to operate at a lower performance state, power consumption, etc.) With reference to the experimental embodiment 400 illustrated in FIG. 4, at decision block 706 the PSoC 410 may access and modify registers in the CPU 434 (e.g., via the SIO chip 418 and/or the PCH 426) to change the current operating level of the CPU 434 (e.g., to instruct the CPU to operate at a lower performance state, power consumption, etc.). However, while a few specific examples have been provided, one of skill in the art in possession of the present disclosure will recognize that changing the operating level of a CPU may be performed in a variety of manners while remaining within the scope of the present disclosure. The method 700 then returns to block 702 where the throttling residency in the one or more throttling states is monitored substantially as described above.

If, at decision block 706, it is determined that the central processing system is not operating above the minimum level, the method 700 then proceeds to decision block 710 where it is determined whether the graphics processing system is operating above a minimum level. In an embodiment, at decision block 710, the throttling engine 204 operates to identify the current operating level of the graphics processing system 208, and determine whether that current operating level is above a minimum operating level for the graphics processing system 208. For example, with reference to the throttling engine 300 of FIG. 3, at decision block 710, the embedded controller 312 may access registers in the GPU to identify the current operating level of the GPU, and then determine whether that current operating level is above the minimum operating level of the GPU. With reference to the experimental embodiment 400 illustrated in FIG. 4, at decision block 710 the PSoC 410 may access registers in the GPU 428 (e.g., via the SIO chip 418 and/or the PCH 426) to identify the current operating level of the GPU 438, and determine whether that current operating level is above a minimum operating level of the GPU 438. However, while a few specific examples have been provided, one of skill in the art in possession of the present disclosure will recognize that the determination of a current operating level of a GPU, and whether that current operating level is above a minimum operating level, may be performed in a variety of manners while remaining within the scope of the present disclosure.

If, at decision block 710, it is determined that the graphics processing system is not operating above the minimum level, the method 700 then returns to block 702 where the throttling residency in the one or more throttling states is monitored substantially as described above. If, at decision block 710, it is determined that the graphics processing system is operating above the minimum level, the method 700 then proceeds to block 712 where graphics processing system operation is reduced. In an embodiment, at block 712, the throttling engine 204 operates to reduce the operating level of the graphics processing system 208. For example, with reference to the throttling engine 300 of FIG. 3, at block 712, the embedded controller 312 may access and modify registers in the GPU to change the current operating level of the GPU (e.g., to instruct the GPU to operate at a lower performance state, power consumption, etc.) With reference to the experimental embodiment 400 illustrated in FIG. 4, at block 712 the PSoC 410 may access and modify registers in the GPU 438 (e.g., via the SIO chip 418 and/or the PCH 426) to change the current operating level of the GPU 438 (e.g., to instruct the GPU to operate at a lower performance state, power consumption, etc.). However, while a few specific examples have been provided, one of skill in the art in possession of the present disclosure will recognize that changing the operating level of a GPU may be performed in a variety of manners while remaining within the scope of the present disclosure. The method 700 then returns to block 702 where the throttling residency in the one or more throttling states is monitored substantially as described above.

Thus, in response to determining that the throttling residency is higher than a limit at decision block 704, the method 700 proceeds through blocks 706, 708, 710, and 712 to first reduce the operation of the central processing system/CPU until it is operating at a minimum level, and the reduce the operation of the graphics processing system/GPU until it is operating at a minimum level. As such, in a specific embodiment, when the performance of the methods 500 and/or 600 result in a relatively high level of throttling, the CPU operation may first be reduced to allow the GPU to continue to operate at a high operating level while hopefully reducing the amount of throttling, followed by the reduction of the operation of the GPU in order to reduce the amount of throttling, which may be particularly beneficial on high performance graphics systems utilizing relatively low rated power adapters.

If, at decision block 704, it is determined that the throttling residency is not higher than the limit, the method 700 then proceeds to decision block 714 where it is determined whether a graphics processing system is operating below a desired level. In an embodiment, at decision block 714, the throttling engine 204 operates to identify the current operating level of the graphics processing system 208, and determine whether that current operating level is below a desired operating level for the graphics processing system 208. For example, with reference to the throttling engine 300 of FIG. 3, at decision block 710, the embedded controller 312 may access registers in the GPU to identify the current operating level of the GPU, and then determine whether that current operating level is below a desired operating level of the GPU (e.g., a nominal operating level, a preferred operating level set by the user, etc.). With reference to the experimental embodiment 400 illustrated in FIG. 4, at decision block 710 the PSoC 410 may access registers in the GPU 428 (e.g., via the SIO chip 418 and/or the PCH 426) to identify the current operating level of the GPU 438, and determine whether that current operating level is below a desired operating level of the GPU 438 (e.g., a nominal operating level, a preferred operating level set by the user, etc.). As discussed above, while a few specific examples have been provided, one of skill in the art in possession of the present disclosure will recognize that the determination of a current operating level of a GPU, and whether that current operating level is below a desired operating level, may be performed in a variety of manners while remaining within the scope of the present disclosure If, at decision block 714, it is determined that the graphics processing system is operating below the desired level, the method 700 then proceeds to block 716 where graphics processing system operation is increased. In an embodiment, at block 716, the throttling engine 204 operates to increase the operating level of the graphics processing system 208. For example, with reference to the throttling engine 300 of FIG. 3, at block 712, the embedded controller 312 may access and modify registers in the GPU to change the current operating level of the GPU (e.g., to instruct the GPU to operate at a higher performance state, power consumption, etc.) With reference to the experimental embodiment 400 illustrated in FIG. 4, at block 712 the PSoC 410 may access and modify registers in the GPU 438 (e.g., via the SIO chip 418 and/or the PCH 426) to change the current operating level of the GPU 438 (e.g., to instruct the GPU to operate at a higher performance state, power consumption, etc.). However, while a few specific examples have been provided, one of skill in the art in possession of the present disclosure will recognize that changing the operating level of a GPU may be performed in a variety of manners while remaining within the scope of the present disclosure. The method 700 then returns to block 702 where the throttling residency in the one or more throttling states is monitored substantially as described above.

If, at decision block 714, it is determined that the graphics processing system is not operating below the desired level, the method 700 then proceeds to decision block 718 where it is determined whether the central processing system is operating below a desired level. In an embodiment, at decision block 718, the throttling engine 204 operates to identify the current operating level of the central processing system 210, and determine whether that current operating level is below a desired operating level for the central processing system 210. For example, with reference to the throttling engine 300 of FIG. 3, at decision block 718, the embedded controller 312 may access registers in the CPU to identify the current operating level of the CPU, and then determine whether that current operating level is below a desired operating level of the CPU (e.g., a nominal operating level, a preferred operating level set by the user, etc.). With reference to the experimental embodiment 400 illustrated in FIG. 4, at decision block 718 the PSoC 410 may access registers in the CPU 434 (e.g., via the SIO chip 418 and/or the PCH 426) to identify the current operating level of the CPU 434, and determine whether that current operating level is below a desired operating level of the CPU 434 (e.g., a nominal operating level, a preferred operating level set by the user, etc.). However, while a few specific examples have been provided, one of skill in the art in possession of the present disclosure will recognize that the determination of a current operating level of a CPU, and whether that current operating level is below a desired operating level, may be performed in a variety of manners while remaining within the scope of the present disclosure If, at decision block 718, it is determined that the central processing system is not operating below the desired level, the method 700 then returns to block 702 where the throttling residency in the one or more throttling states is monitored substantially as described above. If, at decision block 718, it is determined that the central processing system is operating below the desired level, the method 700 then proceeds to block 710 where central processing system operation is increased. In an embodiment, at block 720, the throttling engine 204 operates to increase the operating level of the central processing system 210. For example, with reference to the throttling engine 300 of FIG. 3, at block 720, the embedded controller 312 may access and modify registers in the CPU to change the current operating level of the CPU (e.g., to instruct the CPU to operate at a higher performance state, power consumption, etc.) With reference to the experimental embodiment 400 illustrated in FIG. 4, at block 720 the PSoC 410 may access and modify registers in the CPU 434 (e.g., via the SIO chip 418 and/or the PCH 426) to change the current operating level of the CPU 434 (e.g., to instruct the CPU to operate at a higher performance state, power consumption, etc.). However, while a few specific examples have been provided, one of skill in the art in possession of the present disclosure will recognize that changing the operating level of a CPU may be performed in a variety of manners while remaining within the scope of the present disclosure. The method 700 then returns to block 702 where the throttling residency in the one or more throttling states is monitored substantially as described above.

Thus, in response to determining that the throttling residency is not higher than a limit at decision block 704, the method 700 proceeds through blocks 714, 716, 718, and 720 to first increase the operation of the graphics processing system/GPU (if it is operating below a desired level) until it is operating at its desired level, and then increase the operation of the central processing system/CPU (if it is operating below a desired level) until it is operating at its desired level. As such, in a specific embodiment, when the performance of the methods 500 and/or 600 result in a relatively high level of throttling, the CPU operation and/or GPU operation may be reduced, and when the throttling decreases below a limit, the operation of the GPU is first increased back to its desired level, followed by increasing the operation of the CPU back to its desired level, which may be particularly beneficial on high performance graphics systems utilizing relatively low rated power adapters. In addition, if the method 700 indicates that throttling is being performed too seldom, the GPU and/or CPU may have their operation increased over the desired level to provide further performance increases.

Thus, systems and methods have been described that provide for real-time, constant, and accurate monitoring of system level power consumption, and the performance of hardware-based throttling based on that power consumption monitoring to quickly react to power excursions (e.g., power consumption over a maximum available power level, power consumption over a rated power level for a predetermined time period, etc.) that would otherwise cause shutdown of the power subsystem. The systems and methods of the present disclosure also utilize software to adjust component operation so that the hardware-based throttling does not impact the user experience more than necessary, reducing the operating level of components when the throttling is performed more than a desired frequency. As discussed above, the systems and methods of the present disclosure allow previously unsupported computing device configurations to be provided, while allowing relatively lower rated power subsystems to be utilized with computing devices that include computing device configurations and/or that are expected to execute workloads that may occasionally exceed the power capabilities of those power subsystems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power-subsystem-monitoring-based computing system, comprising:
   a power subsystem;
   a first computing component that is coupled to the power subsystem;
   a processing system that is coupled to the power subsystem and the first computing component; and
   a memory system that is coupled to the processing system and that includes instructions that, when executed by the processing system, cause the processing system to provide a throttling engine that is configured to:
   activate a first throttling of the first computing component when power being consumed from the power subsystem exceeds a first power provisioning level for the power subsystem, and deactivate the first throttling of the first computing component when the power being consumed from the power subsystem no longer exceeds the first power provisioning level of the power subsystem;
   activate a second throttling of the first computing component when the power being consumed over time from the power subsystem exceeds a second power provisioning level of the power subsystem for a predetermined second throttling threshold time period, and deactivate the second throttling of the first computing component when the power being consumed over time from the power subsystem no longer exceeds the second power provisioning level of the power subsystem; and
   modify the operating capabilities of the first computing component when the second throttling has been performed more than a predetermined number of times in a predetermined operating capability modification threshold time period, and modify the operating capabilities of the first computing component when the second throttling has been performed less than the predetermined number of times in the predetermined operating capability modification threshold time period and the first computing component is operating below a first computing component operating capability.

2. The system of claim 1, wherein the first computing component is a graphics processing system.

3. The system of claim 1, further comprising:
   a second computing component that is coupled to the power subsystem and the throttling engine, wherein the throttling engine is configured to:

activate a third throttling of the second computing component when the power being consumed over time from the power subsystem exceeds the second power provisioning level of the power subsystem for a predetermined third throttling threshold time period immediately following the predetermined second throttling threshold time period, and deactivate the third throttling of the second computing component when the power being consumed over time from the power subsystem no longer exceeds the second power provisioning level of the power subsystem.

4. The system of claim 3, wherein the throttling engine is configured to:
modify the operating capabilities of the second computing component when the second throttling has been performed more than the predetermined number of times in the predetermined operating capability modification threshold time period, wherein the operating capabilities of the first computing component are modified when the second throttling has been performed more than the predetermined number of times in the predetermined operating capability modification threshold time period and the operating capabilities of the second computing component have been modified to a minimum level; and
modify the operating capabilities of the second computing component when the second throttling has been performed less than the predetermined number of times in the predetermined operating capability modification threshold time period, the first computing component is operating at the first computing component operating capability, and the second computing component is operating below a second computing component operating capability.

5. The system of claim 3, wherein the second computing component is a central processing system.

6. The system of claim 1, wherein the throttling engine is configured to:
characterize the power subsystem and determine the first power provisioning level of the power subsystem and the second power provisioning level of the power subsystem.

7. The system of claim 1, wherein the power subsystem is a power adapter.

8. An Information Handling System (IHS), comprising:
a processing system; and
a memory system that is coupled to the processing system and that includes instructions that, when executed by the processing system, cause the processing system to provide a throttling engine that is configured to:
activate a first throttling of a first component when power being consumed from a power subsystem that powers the component exceeds a first power provisioning level of the power subsystem, and deactivate the first throttling of the first component when the power being consumed from the power subsystem no longer exceeds the first power provisioning level of the power subsystem;
activate a second throttling of the first component when the power being consumed over time from the power subsystem exceeds a second power provisioning level of the power subsystem for a predetermined second throttling threshold time period, and deactivate the second throttling of the first component when the power being consumed over time from the power subsystem no longer exceeds the second power provisioning level of the power subsystem; and
modify the operating capabilities of the first component when the second throttling has been performed more than a predetermined number of times in a predetermined operating capability modification threshold time period, and modify the operating capabilities of the first component when the second throttling has been performed for less than the predetermined operating capability modification threshold time period and the first component is operating below a first component operating capability.

9. The IHS of claim 8, wherein the throttling engine is configured to:
activate a third throttling of a second component when the power being consumed over time from the power subsystem exceeds the second power provisioning level of the power subsystem for a predetermined third throttling threshold time period immediately following the predetermined second throttling threshold time period, and deactivate the third throttling of the second component when the power being consumed over time from the power subsystem no longer exceeds the second power provisioning level of the power subsystem.

10. The IHS of claim 9, wherein the throttling engine is configured to:
modify the operating capabilities of the second component when the second throttling has been performed more than the predetermined number of times in the predetermined operating capability modification threshold time period, wherein the operating capabilities of the second component are modified when the second throttling has been performed more than the predetermined number of times in the predetermined operating capability modification threshold time period and the operating capabilities of the second component have been modified to a minimum level; and
modify the operating capabilities of the second component when the second throttling has been performed less than the predetermined number of times in the predetermined operating capability modification threshold time period, the first component is operating at the first component operating capability, and the second component is operating below a second component operating capability.

11. The IHS of claim 10, wherein the throttling engine is configured to:
characterize the power subsystem and determine the first power provisioning level of the power subsystem and the second power provisioning level of the power subsystem.

12. The IHS of claim 8, wherein the power subsystem is a power adapter.

13. The IHS of claim 8, wherein the power subsystem is a battery.

14. A method for providing power-subsystem-monitoring-based computing, comprising:
activating, by a throttling subsystem, a first throttling of a first computing component when power being consumed from a power subsystem that powers the first computing component exceeds a first power provisioning level of the power subsystem, and deactivating the first throttling of the first computing component when the power being consumed from the power subsystem no longer exceeds the first power provisioning level of the power subsystem;

activating, by the throttling subsystem, a second throttling of the first computing component when the power being consumed over time from the power subsystem exceeds a second power provisioning level of the power subsystem for a predetermined second throttling threshold time period, and deactivating the second throttling of the first computing component when the power being consumed over time from the power subsystem no longer exceeds the second power provisioning level of the power subsystem; and modifying, by the throttling subsystem, the operating capabilities of the first computing component when the second throttling has been performed more than a predetermined number of times in a predetermined operating capability modification threshold time period, and modifying the operating capabilities of the first computing component when the second throttling has been performed less than the predetermined number of times in the predetermined operating capability modification threshold time period and the first computing component is operating below a first computing component operating capability.

15. The method of claim 14, wherein the first computing component is a graphics processing system.

16. The method of claim 14, further comprising:
activating, by the throttling subsystem, a third throttling of a second computing component when the power being consumed over time from the power subsystem that powers the second computing component exceeds the second power provisioning level of the power subsystem for a predetermined third throttling threshold time period immediately following the predetermined second throttling threshold time period, and deactivating the third throttling of the second computing component when the power being consumed over time from the power subsystem no longer exceeds the second power provisioning level of the power subsystem.

17. The method of claim 16, further comprising:
modifying, by the throttling subsystem, the operating capabilities of the second computing component when the second throttling has been performed more than the predetermined number of times in the predetermined operating capability modification threshold time period, wherein the operating capabilities of the first computing component are modified when the second throttling has been performed more than the predetermined number of times in the predetermined operating capability modification threshold time period and the operating capabilities of the second computing component have been modified to a minimum level; and modifying, by the throttling subsystem, the operating capabilities of the second computing component when the second throttling has been performed less than the predetermined number of times in the predetermined operating capability modification threshold time period, the first computing component is operating at the first computing component operating capability, and the second computing component is operating below a second computing component operating capability.

18. The method of claim 16, wherein the second computing component is a central processing system.

19. The method of claim 14, further comprising:
characterizing, by the throttling subsystem, the power subsystem and determining the first power provisioning level of the power subsystem and the second power provisioning level of the power subsystem.

20. The method of claim 14, wherein the power subsystem is a power adapter.

* * * * *